US007843460B2

(12) United States Patent
Rai et al.

(10) Patent No.: US 7,843,460 B2
(45) Date of Patent: Nov. 30, 2010

(54) METHOD AND APPARATUS FOR BANDWIDTH CORRUPTION RECOVERY

(75) Inventors: Barinder Singh Rai, Surrey (CA); Phil Van Dyke, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 831 days.

(21) Appl. No.: 11/735,002

(22) Filed: Apr. 13, 2007

(65) Prior Publication Data

US 2008/0252647 A1 Oct. 16, 2008

(51) Int. Cl.
*G06T 1/60* (2006.01)

(52) U.S. Cl. ........................ 345/530; 345/531; 345/520

(58) Field of Classification Search ....................... None
See application file for complete search history.

(56) References Cited

U.S. PATENT DOCUMENTS

| | | | |
|---|---|---|---|
| 4,303,912 A | 12/1981 | Stafford et al. | |
| 5,568,165 A | 10/1996 | Kimura | |
| 5,828,383 A | 10/1998 | May et al. | |
| 5,917,503 A | 6/1999 | Zakharia et al. | |
| 6,035,096 A | 3/2000 | Kusakabe | |
| 6,157,987 A | 12/2000 | Krishnamurthy et al. | |
| 6,940,516 B1 | 9/2005 | Dotson | |
| 6,950,144 B2 | 9/2005 | Chae | |
| 7,215,339 B1 * | 5/2007 | Dotson | 345/558 |
| 2003/0142058 A1 * | 7/2003 | Maghielse | 345/98 |
| 2003/0184678 A1 | 10/2003 | Chen et al. | |
| 2004/0249980 A1 | 12/2004 | Hutler et al. | |
| 2005/0043959 A1 | 2/2005 | Stemerdink et al. | |
| 2006/0022985 A1 * | 2/2006 | Shepherd et al. | 345/535 |

FOREIGN PATENT DOCUMENTS

| | | |
|---|---|---|
| EP | 0460751 | 12/1991 |
| EP | 1271933 | 1/2003 |
| EP | 1605400 | 12/2005 |
| JP | 10293842 | 11/1998 |
| JP | 2001223988 | 8/2001 |

* cited by examiner

*Primary Examiner*—Ulka Chauhan
*Assistant Examiner*—Donna J Ricks
(74) *Attorney, Agent, or Firm*—Mark P. Watson

(57) ABSTRACT

A graphics processor is provided. The graphics processor includes a memory storing image data for presentation and a display memory region in communication with the memory, the display memory region supplying image data to a display panel for presentation. The graphics processor includes bandwidth control logic configured to monitor a lag between an output from the display memory region and an input into the display memory region. The bandwidth control logic is further configured to prevent a level of the display memory from decrementing when the lag between the output and the input is capable of causing corruption on the display panel due to a lack of data from the display memory region. A method for avoiding a buffer under run and a device are included.

16 Claims, 4 Drawing Sheets

METHOD AND APPARATUS FOR BANDWIDTH CORRUPTION RECOVERY

CROSS REFERENCE TO RELATED APPLICATIONS

This application is related to application Ser. No. 11/734,972 entitled "Self-Automating Bandwidth Priority Memory Controller," and application Ser. No. 11/734,969 entitled "Method and Apparatus for Providing Bandwidth Priority." These applications are herein incorporated by reference in their entireties for all purposes.

BACKGROUND

As hand-held battery powered devices are incorporating more and more functionality, the memory integrated into those devices is being accessed by multiple devices. In order to maintain costs, the memory within these devices is typically a single ported memory. Especially with cell phones, as camera functionality and other functionality is being included within the cell phone, the memory is being accessed and must support numerous input/output devices. With these multiple memory accesses comes the possibility of failure of the memory to supply data to a display pipe where the data is to be presented on a display panel. Should the memory fail to supply data to a display pipe, the resulting display will appear corrupted on the display panel.

One attempt to resolve this corruption is to incorporate oversized display buffers within the devices. However, this approach still may not prevent a buffer under run and corruption may occur within the display panel. Furthermore, there are costs associated with the increased display pipe, as well as real estate concerns as the hand-held battery powered devices are becoming smaller and smaller. Accordingly there is a need to prevent the corrupted data from being displayed without having an oversized display pipe.

SUMMARY

Broadly speaking, the present invention fills these needs by providing a technique that avoids the presentation of any corrupt data on the display panel as a result of a buffer under run. It should be appreciated that the present invention can be implemented in numerous ways, including as a process, an apparatus, a system, a device, or a method. Several inventive embodiments of the present invention are described below.

In one embodiment, a method for preventing data corruption from being displayed due to limited bandwidth availability of a display controller's memory is provided. The method includes identifying a level of available data within a memory region supplying pixel data to a display panel. The method includes determining that the display panel is requesting data outside the level of available data within the memory region and identifying whether the display controller's memory is capable of supplying the data outside the level of available data within the memory region in response to the determining. The decrementing of the level of available data within the memory region is paused when the display controller's memory is incapable of supplying the data outside the level of available data within the memory region. A next set of data is supplied to the display controller's memory. The available data is then displayed.

In another embodiment, a graphics processor is provided. The graphics processor includes a memory storing image data for presentation and a display memory region in communication with the memory, the display memory region supplying image data to a display panel for presentation. The graphics processor includes bandwidth control logic configured to monitor a lag between an output from the display memory region and an input into the display memory region. The bandwidth control logic is further configured to prevent a level of the display memory from decrementing when the lag between the output and the input is capable of causing corruption on the display panel due to a lack of data from the display memory region.

In yet another embodiment, a portable computing device is provided. The portable computing device includes a central processing unit (CPU), a system memory, and a display panel. The portable computing device further includes a mobile graphics engine (MGE) which may be referred to as a graphics processor. The MGE includes a memory storing image data for presentation and a display memory region in communication with the memory, where the display memory region supplies image data to a display panel for presentation. The MGE includes bandwidth control logic configured to monitor a lag between an output from the display memory region and an input into the display memory region. The bandwidth control logic is further configured to prevent a level of the display memory from decrementing when the lag between the output and the input is capable of causing corruption on the display panel due to a lack of data from the display memory region. The portable computing device includes a bus enabling communication between the CPU, the system memory, the display panel, and the MGE.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

The embodiments described herein provide a technique for avoiding corruption due to a lack of access or bandwidth from the memory supplying data to a display panel. Logic within a display controller or graphics controller functions to monitor the lag between the input and the output of a display pipe in order to anticipate an underflow condition and provide data to avoid any corruption from being presented on a display panel controlled by the display controller. In one embodiment, a pause signal is used to prevent a display pipe location from decrementing from a last available position so that the pixel value form the last available position is repeatedly displayed until the memory can supply requested data to the display pipe and display panel. As described below, alternative techniques to repeatedly supplying the last pixel value, such as averaging previous values, determining a trend from the previous values, etc., may be used to further enhance the method and apparatus described herein.

Figure 1:
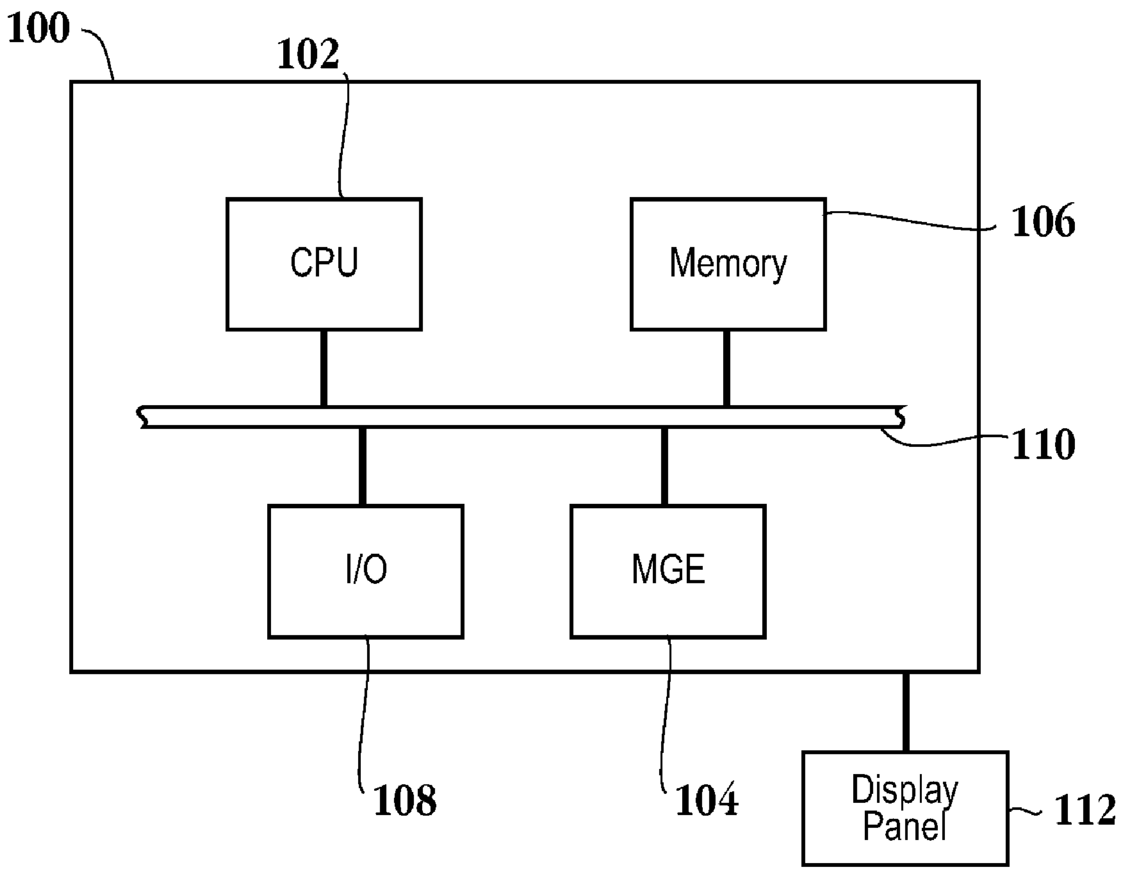
FIG. 1 is a high-level simplified schematic diagram of a device having the capability to avoid corruption from being presented on a display even when a buffer under run may occur within a display pipe in accordance with one embodiment of the invention.

FIG. 1 is a high-level simplified schematic diagram of a device having the capability to avoid corruption from being presented on a display even when a buffer under run may occur within a display pipe in accordance with one embodiment of the invention. Device 100 includes central processing unit (CPU) 102 and mobile graphics engine (MGE) 104. It should be appreciated that MGE 104 may be referred to as a graphics processing unit or graphics controller. Device 100 further includes memory 107 and input/output (I/O) block 108. Each of CPU 102, MGE 104, memory 107, and I/O 108 are in communication with each other over bus 110. One skilled in the art will appreciate that device 100 may be any suitable hand-held portable electronic device, e.g., a cell phone, a personal digital assistant, a web tablet, etc. Device 100 also includes display panel 112. While display panel 112 is illustrated as a separate entity from the housing that includes the CPU 102, memory 107, MGE 104 and I/O 108, it should be appreciated that the display panel may be integrated into the housing for these components in another embodiment. Within MGE 104 is included bandwidth control logic that monitors the lag between the output and input of a display pipe to avoid corruption being presented on display panel 112 even when a buffer under run occurs. In one embodiment, the bandwidth control logic detects the lack of data available in a display pipe within MGE 104 and is configured to pause the decrementing of a level within the display pipe so as to continually display a same pixel value in one embodiment of the invention. It will be apparent to one skilled in the art that additional modules/blocks may be incorporated into the device of FIG. 1 according to the functionality desired. For example, an image capture sensor, such as a camera sensor, and corresponding interface, may be integrated into device 100. The camera sensor may be either a complimentary metal oxide semiconductor sensor (CMOS) or charge-coupled device (CCD).

Figure 2:
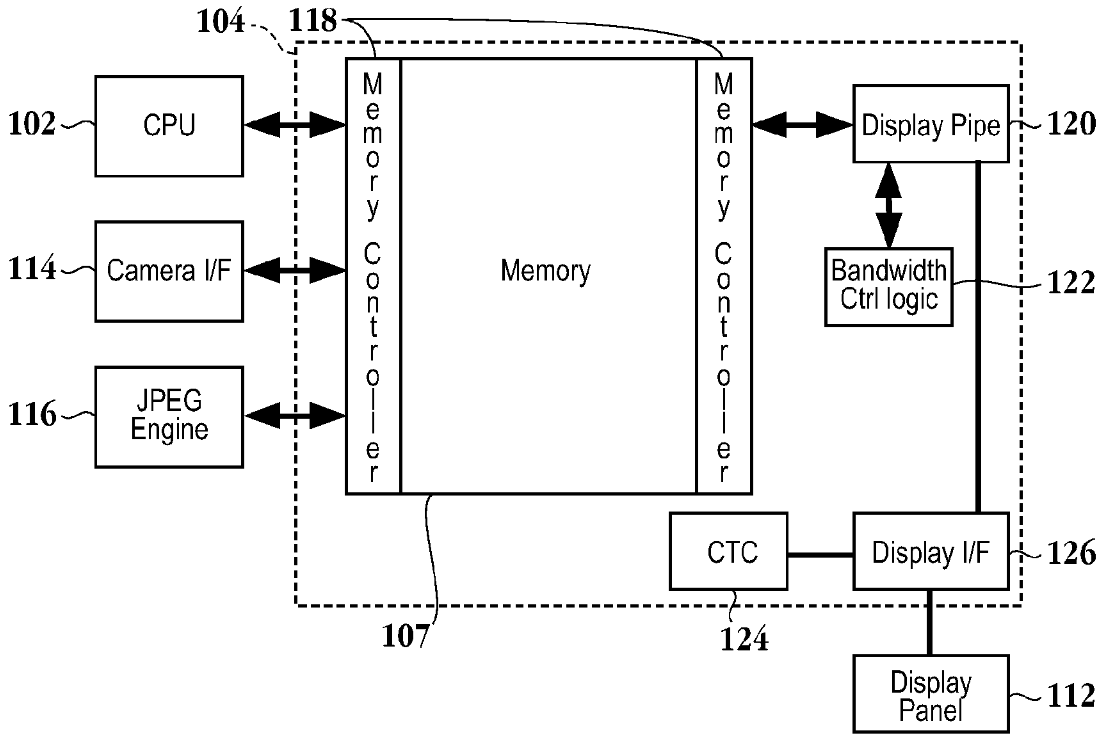
FIG. 2 is a simplified schematic diagram illustrating further details of the mobile graphics engine and integrated bandwidth control logic in accordance with one embodiment of the invention.

FIG. 2 is a simplified schematic diagram illustrating further details of the mobile graphics engine and integrated bandwidth control logic in accordance with one embodiment of the invention. Memory 107 includes a memory controller 118 controlling access to the contents within memory 107. Numerous functional blocks may be requesting access to memory, and the request for access is controlled through memory controller 118. For example, CPU 102, camera interface 114, joint photographic expert group (JPEG) engine 116 are some exemplary functional blocks that may be requesting access to memory 107. One skilled in the art will appreciate that numerous other functional blocks may be requesting access and the functional blocks listed herein are not meant to be limiting. Display pipe 120 of MGE 104 also request access to memory 107. In one embodiment, display pipe 120 is 16 bits deep and can obtain a 16 bit per pixel data unit. As mentioned above, because of the numerous requests on memory 107, display pipe 120 may not be refilled as required in order to prevent the display panel from presenting corrupted data. In order to prevent this situation, bandwidth control logic 122 is in communication with display pipe 120 and monitors any lag between the output and input of display pipe 120. Display pipe 120 communicates display data to display interface 126 which communicates with display panel 112. Timing and control signals are communicated to display interface 126 by core timing and control (CTC) block 124.

Figure 3A:
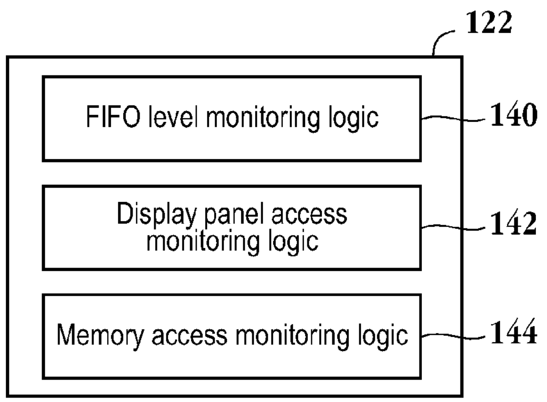
FIG. 3A is a high-level schematic diagram illustrating the contents within bandwidth control logic block in accordance with one embodiment of the invention.

FIG. 3A is a high-level schematic diagram illustrating the contents within bandwidth control logic block in accordance with one embodiment of the invention. Bandwidth control logic block 122 includes first in first out (FIFO) level monitoring logic 140, display panel access monitoring logic 142, and memory access monitoring logic 144. FIFO level monitoring logic 140 functions to determine whether a level of the display pipe is approaching a last available pixel. Display panel access monitoring logic 142 functions to determine whether an access is being made to the display pipe from the display panel in accordance with one embodiment of the invention. Memory access monitoring logic 144 determines whether the memory is unable to provide requested data to the display pipe in accordance with one embodiment of the invention. As explained in more detail below, the logic blocks function to identify a lag between the input into and the output from a display pipe through FIFO level monitoring logic 140 in one embodiment. Display panel access monitoring logic 142 uses the output from FIFO level monitoring logic 140 and a display access signal to identify if the display panel is calling for data that may be outside or beyond the data stored within the display pipe. For example, where FIFO level monitoring logic 140 indicates that a single pixel worth of data is available and the display panel is calling for additional data, FIFO level monitoring logic 140 and display panel access monitoring logic 142 identify that a buffer under run or under flow will occur. Memory access monitoring logic 144 utilizes the output from the display panel access monitoring logic 142 and an acknowledgement/non-acknowledgement signal to determine if the memory from the graphics controller is available to supply the additional data to avoid the buffer under flow.

Figure 3B:
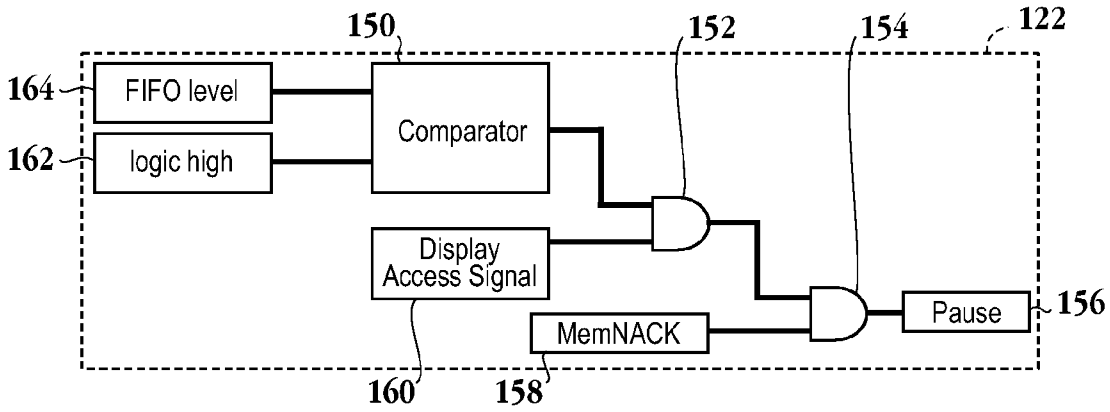
FIG. 3B is a simplified schematic diagram illustrating hardware components of the bandwidth control logic in accordance with one embodiment of the invention.

FIG. 3B is a simplified schematic diagram illustrating hardware components of the bandwidth control logic in accordance with one embodiment of the invention. As illustrated within bandwidth control logic 122, comparator 150 compares FIFO level signal 164 to a logic high value 162 in order to determine whether the FIFO level is at a last pixel to be displayed. That is, if only one pixel value is left within display pipe 120 of FIG. 2, then the FIFO level 164 and the logic high value 162 will be the same, i.e., logic high values, and the output of comparator 150 is a logic high value. In this instance, a logic high value is output to AND gate 152, which also includes display access signal 160 as an input. Where display access signal indicates that the display panel is requesting access to the display pipe for data, a logic high signal will be combined with the logic high signal output from comparator 150, resulting in a logical high value being output from AND gate 152 and transmitted to AND gate 154. A memory non-acknowledgement signal 158 will indicate that the memory is busy and cannot provide data to display pipe 120. Thus, the logical high values from the output of AND gate 152 and memory non-acknowledgement signal 158 will result in a logical high value characterized as pause signal 156. Pause signal 156 will function to prevent the FIFO (display pipe) from decrementing a FIFO level from for example, position one, the position of a last remaining pixel value in the FIFO, to position 15 (bit fifteen) in the display pipe. When the pause signal is a logical high value, it should be appreciated that the output from display pipe 120 of FIG. 2 will be paused at the last available pixel data point and the memory is instructed that the previous requested data is no longer needed and the next address will be requested from memory. This continues to occur until valid pixel data is placed into display pipe 120. When valid data is placed into display pipe 120, the memory non-acknowledge signal 158 will transition to a logical low signal indicating that valid data has been passed into the display pipe. Consequently, the value output from AND gate 154 will be a logical low value. One skilled in the art will appreciate as the memory runs faster than the display panel interface that once the memory is freed up the display pipe will be filled. Furthermore, as FIG. 2 illustrates a single display pipe, it should be appreciated that multiple display pipes are typical within a device. Where multiple display pipes are integrated, the bandwidth control logic may be replicated for each display pipe, or may be configured to support multiple display pipes.

It should be appreciated that in addition to causing a last available pixel to repeatedly display in order to prevent a buffer under run, the method may be modified in order to provide different functionality for providing replacement data to prevent the buffer under run. For example, instead of displaying the last pixel value repeatedly until valid data is available, an alternative embodiment may include averaging the last x number of pixel values in the display pipe. In one embodiment, display pipe 120 may include 16 bits of data and as memory 107 is busy, additional data is not available to write over the previous data within display pipe 120. Therefore, circuitry within display pipe 120 may take the sum of x number of pixels and divide that sum to yield an average pixel value and communicate the average value to be displayed. The average value circuitry will be included within display pipe 120 in one embodiment. As an alternative to the averaging scheme described above, an incrementing scheme may be included. In the incrementing scheme, the first pixel may be displayed and then the successive pixels are all incremented by a previously determined amount. For example, if a pause signal is transmitted from the bandwidth control logic, the last available pixel may be displayed initially but then for each next pixel to be displayed, the value of that last pixel is successively incremented by any value stored in a register. Again, the logic to accomplish this incrementation will be included within display pipe 120. It should be noted that the value may be decremented in a similar manner. As yet another alternative to the incrementing scheme is a rate of change scheme. In the rate of change scheme the 16 values within display pipe 120 are evaluated and it is determined whether the values are increasing, decreasing, or staying the same over the span of the 16 bits. Of course, the determination may be made starting from either end of the display pipe. Then, the average difference between the 16 values can be applied to each pixel value successively being sent out for the pause condition, where each value successively sent out is the average value described above. The average difference will increase or decrease depending on whether the values of the 16 bits are increasing or decreasing, respectively. It should be appreciated that each of these schemes will improve the quality of the display presented to a user as well as prevent corruption from being displayed to the user.

Figure 4:
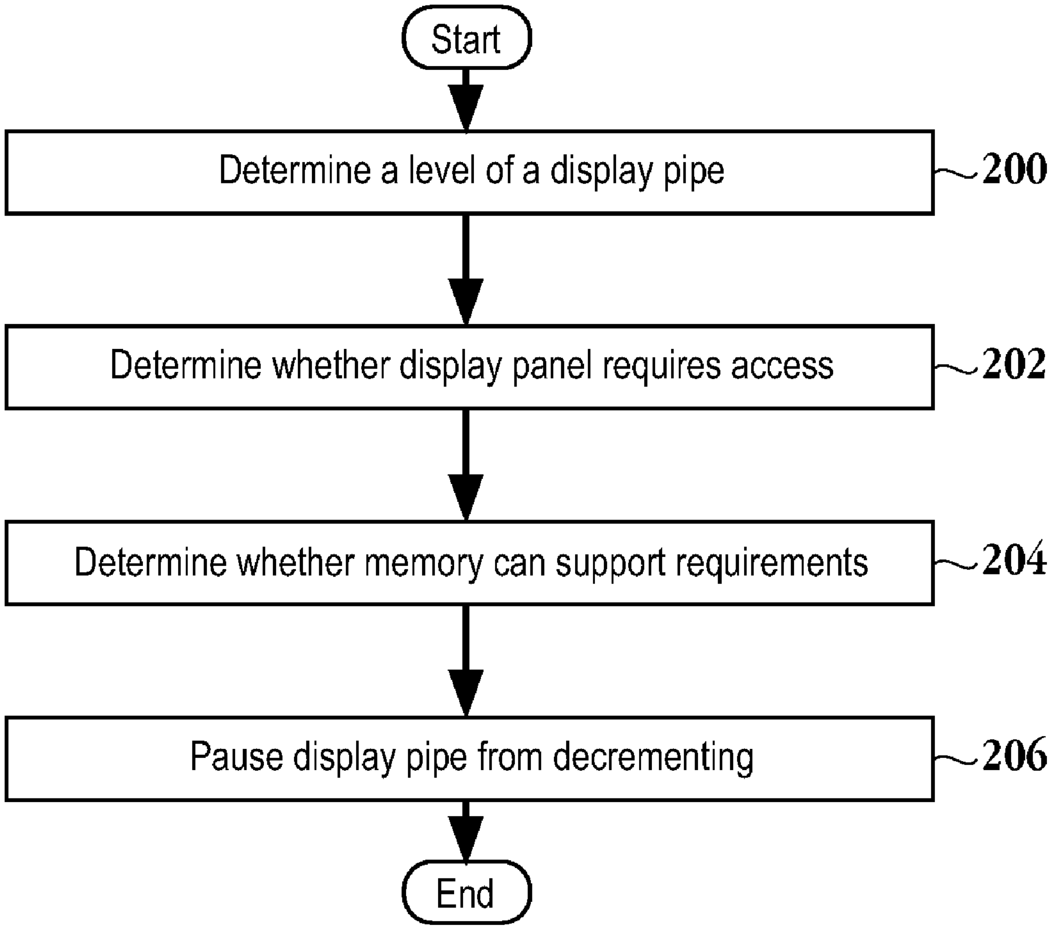
FIG. 4 is a flow chart diagram illustrating the method operations for preventing corruption from being displayed on a display panel in accordance with one embodiment of the invention.

FIG. 4 is a flow chart diagram illustrating the method operations for preventing corruption from being displayed on a display panel in accordance with one embodiment of the invention. The method initiates with operation 200 where a level of a display pipe is determined. Here, the level of the display pipe is monitored to see if a last available pixel within the display pipe is to be presented. In one embodiment, a position within the display pipe is monitored as discussed with reference to FIG. 3B. In essence, the lag between the input into and output from the display pipe is monitored. If the last available pixel within the display pipe is being presented, then it is determined whether the display panel is requesting access to the last available pixel within the display pipe in operation 202. Here, whether the display panel is requesting access may be determined through the logic configuration discussed above with reference to FIGS. 3A and 3B, in one embodiment. If the last available pixel within the display pipe is being requested, it is then determined whether memory can support a request for additional pixel data in operation 204. If the memory cannot support the requested for additional data, i.e., the memory is busy supporting other functions, then the method proceeds to operation 206 where a pause signal is transmitted to a display pipe to prevent the display pipe from decrementing a level of the display pipe. The pause signal will then guarantee that the last pixel will repeatedly be displayed until the memory is capable of supplying additional data to the display pipe. If the memory can support the request, then the data is transmitted into the display pipe for presentation.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for preventing data corruption from being displayed due to limited bandwidth availability of a display controller's memory, comprising method operations of:

identifying a level of available data within a display pipe supplying pixel data to a display panel;

determining that the display panel is requesting data outside the level of available data within the display pipe;

identifying whether the display controller's memory is capable of supplying the data outside the level of available data within the display pipe in response to the determining;

pausing decrementing of the level of available data within the display pipe when the display controller's memory is incapable of supplying the data outside the level of available data within the display pipe;

wherein the method operation of pausing decrementing of the level of available data within the display pipe when the display controller's memory is incapable of supplying the data outside the level of available data within the display pipe includes, averaging the available data within the display pipe with previously displayed data not vet overwritten in the display pipe to yield average data;

communicating to the display controller's memory to supply a next set of data; and displaying the average data until the display controller's memory is capable of supplying the next set of data.

2. The method of claim 1, wherein the method operation of identifying a level of available data within a display pipe supplying pixel data to a display panel includes, comparing a value representing a number of pixels within a display pipe to a logical high reference value.

3. The method of claim 2, wherein the method operation of determining that the display panel is requesting data outside the level of available data within the display pipe includes, performing a logical operation with an output from the comparing with a display access signal representing whether the display panel is requesting the data outside the level of available data.

4. The method of claim 3, wherein the method operation of identifying whether the display controller's memory is capable of supplying the data outside the level of available data to the display pipe in response to the determining includes, performing a logical operation between an output of the determining that the display panel is requesting the data outside the level of available data and a signal representing whether the display controller's memory is capable of supplying the data outside the level of available data.

5. The method of claim 3, wherein the logical operation is an AND operation.

6. The method of claim 1, wherein the method operation of pausing decrementing of the level of available data within the display pipe when the display controller's memory is incapable of supplying the data outside the level of available data within the display pipe includes, copying the available data within the memory until the display controller's memory is capable of supplying the next set of data.

7. The method of claim 1, wherein the method operation of displaying the average data until the display controller's memory is capable of supplying the next set of data includes, changing the average data for each successive display period that the display controller's memory is incapable of supplying the data outside the level of available data within the display pipe.

8. A graphics processor, comprising:

a memory storing image data for presentation;

a display pipe in communication with the memory, the display pipe supplying image data to a display panel for presentation; and bandwidth control logic configured to monitor a lag between an output from the display pipe and an input into the display pipe, wherein the bandwidth control logic is further configured to prevent a level of the display memory from decrementing when the lag between the output and the input is capable of causing corruption on the display panel due to a lack of data from the display pipe; and wherein the display pipe includes averaging circuitry configured to calculate an average from a last available pixel value within the display pipe and previously displayed pixel values within the display pipe that have not been overwritten.

9. The graphics processor of claim 8, wherein the bandwidth control logic includes display memory level monitoring logic, the display memory level monitoring logic configured to identify a last available pixel value available within the display pipe.

10. The graphics processor of claim 8, wherein the bandwidth control logic includes display panel access monitoring logic, the display panel access monitoring logic configured to identify if the display panel is requesting additional data to a last available pixel value within the display pipe.

11. The graphics processor of claim 8, wherein the bandwidth control logic includes memory access monitoring logic, the memory access monitoring logic configured to identify if the memory storing image data for presentation is available for access by the display pipe prior to a buffer under run.

12. The graphics processor of claim 9, wherein the display memory level monitoring logic includes a comparator.

13. The graphics processor of claim 10, wherein the bandwidth control logic includes a comparator and two AND gates.

14. A portable computing device, comprising:

a central processing unit (CPU);

a system memory;

a display panel;

a mobile graphics engine (MGE), the MGE including, a memory storing image data for presentation;

a display pipe in communication with the memory, the display pipe supplying image data to a display panel for presentation; and bandwidth control logic configured to monitor a lag between an output from the display pipe and an input into the display pipe, wherein the bandwidth control logic is further configured to prevent a level of the display memory from decrementing when the lag between the output and the input is capable of causing corruption on the display panel due to a lack of data from the display pipe; and a bus enabling communication between the CPU, the system memory, the display panel, and the MGE: and wherein the display pipe includes averaging circuitry configured to calculate an average from a last available pixel value within the display pipe and previously displayed pixel values within the display pipe that have not been overwritten.

15. The portable computing device of claim 14, wherein the portable computing device is selected from a group consisting of a cell phone, a web tablet, a pocket personal computer, and a personal digital assistant.

16. The portable computing device of claim 14, wherein the bandwidth control logic outputs a pause signal to prevent a level of the display pipe from decrementing.

* * * * *

UNITED STATES PATENT AND TRADEMARK OFFICE

CERTIFICATE OF CORRECTION

PATENT NO. : 7,843,460 B2
APPLICATION NO. : 11/735002
DATED : November 30, 2010
INVENTOR(S) : Barinder Singh Rai et al.

It is certified that error appears in the above-identified patent and that said Letters Patent is hereby corrected as shown below:

<u>Column 7,</u>

Line 15, please change “displayed data not vet overwritten” to --displayed date not yet overwritten--

Signed and Sealed this
Twenty-second Day of March, 2011

David J. Kappos
*Director of the United States Patent and Trademark Office*